GEO. H MANSFIELD.

Improvement in Planing Machines.

No. 119,163.  Patented Sep. 19, 1871.

Witnesses
Wm H Seaman
Bernard T Janney

Inventor
George H Mansfield
By Daniel Breed
Atty.

UNITED STATES PATENT OFFICE.

GEORGE H. MANSFIELD, OF CONCORD, NEW HAMPSHIRE.

IMPROVEMENT IN PLANING-MACHINES.

Specification forming part of Letters Patent No. 119,163, dated September 19, 1871.

*To all whom it may concern:*

Be it known that I, GEORGE H. MANSFIELD, of Concord, in the county of Merrimack and State of New Hampshire, have invented certain new and useful Improvements in Planing and other Repeating Machines, of which the following is a specification:

My invention consists of a rack-gear provided with elastic bearings and used with planing, jointing, and other machines run by means of a rack-gear, for the purpose of graduating the stopping and starting of the table at each change when thrown back and forth, and thus prevents the noise, jumping, and jar occasioned by the abrupt changes in ordinary machines of this description as heretofore used.

Figure 1:
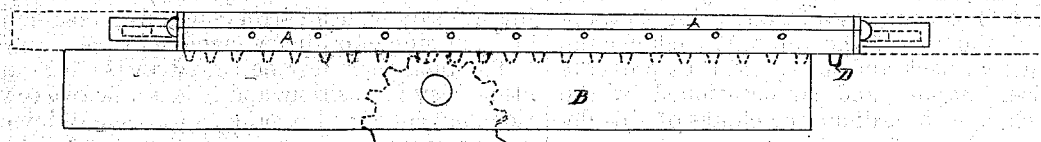
Figure 2:
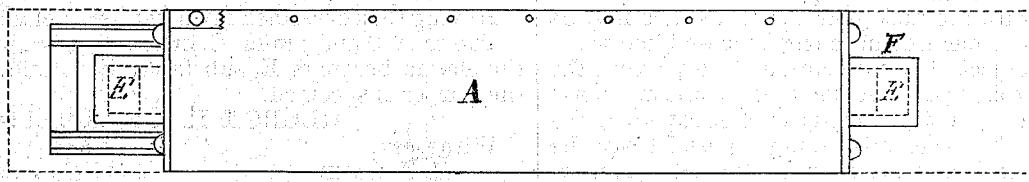
Figure 3:

In the accompanying drawing, Fig. 1 is a side view of my improved rack-gear. Fig. 2 is a top view of the same.

In the application of my improvement the table A, Fig. 1, is moved back and forth upon the ways B by means of the gear-wheel C, which engages with the rack-gear D, all of which may be made and operated in the manner well known.

The object of my invention is to prevent the dead-stroke and consequent jar, strain, and noise of the reciprocating rack-gear when reversing the stroke. To accomplish this purpose I leave the rack-gear D separate from the table A, and movable thereunder. Then I inclose the ends of the rack-gear in bearings F, which are provided with rubber springs E, pressing directly against the end of the rack-gear, and thus allowing the latter a motion in relation to the table. This rack-gear has a reciprocating or reversible motion, derived from the gear-wheel C in the usual manner; and, in consequence of the above-described arrangement of rubber springs or elastic bearings, when the stroke is reversed or changed back and forth the machine moves quietly, instead of having the sudden dead-stroke and disagreeable jar and jumping of ordinary machines.

The rack-gear may be set edgewise or in any other desired position, and it is applicable to various machines; also, other springs and devices and arrangements may be employed.

Instead of the above, the gear-wheel itself may have bearings in slides with elastic bearings at their ends.

I do not limit my invention to the above-described arrangements, as other equivalent means may be employed.

Having thus described my invention, I claim—

The rack D and pinion C, in combination with the elastic bearings E, substantially as and for the purposes specified.

GEORGE H. MANSFIELD.

Witnesses:
S. G. LANE,
A. L. WOODMAN.